US008543408B2

(12) United States Patent
Puthenpura et al.

(10) Patent No.: US 8,543,408 B2
(45) Date of Patent: *Sep. 24, 2013

(54) SYSTEM, DEVICE, AND METHOD FOR RULE-BASED CONFIGURATION

(75) Inventors: Sarat Puthenpura, Berkeley Heights, NJ (US); Sam Parker, Cranbury, NJ (US); Dave Belanger, Hillsborough, NJ (US); Wenjie Zhao, Princeton, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1583 days.

This patent is subject to a terminal disclaimer.

(21) Appl. No.: 11/042,403

(22) Filed: Jan. 25, 2005

(65) Prior Publication Data

US 2006/0166643 A1    Jul. 27, 2006

(51) Int. Cl.
*G06Q 99/00* (2006.01)
(52) U.S. Cl.
USPC .......................................... 705/1.1; 705/7.11
(58) Field of Classification Search
USPC ...................................... 705/7, 8, 1
See application file for complete search history.

(56) References Cited

U.S. PATENT DOCUMENTS

| | | | | |
|---|---|---|---|---|
| 5,701,400 A | * | 12/1997 | Amado | 706/45 |
| 6,185,549 B1 | * | 2/2001 | Rastogi et al. | 706/45 |
| 6,374,224 B1 | * | 4/2002 | Horiguchi et al. | 704/266 |
| 6,965,668 B2 | * | 11/2005 | Clark et al. | 379/116 |
| 7,124,145 B2 | * | 10/2006 | Surasinghe | 707/102 |
| 7,286,990 B1 | * | 10/2007 | Edmonds et al. | 704/275 |
| 8,155,577 B1 | * | 4/2012 | Saad | 434/350 |
| 2002/0169716 A1 | * | 11/2002 | Johnson et al. | 705/40 |
| 2003/0084428 A1 | | 5/2003 | Agostini | |
| 2008/0028030 A1 | * | 1/2008 | Wellons et al. | 709/206 |

FOREIGN PATENT DOCUMENTS

WO    WO 0175696 A1 * 10/2001

OTHER PUBLICATIONS

Hadaya, et al, Roles and Strategies of Contract Manufacturers in the Telecommunications Industy, 2000, Mathematics and Industrial Engineering, pp. 458-463.*

* cited by examiner

*Primary Examiner* — Akiba Allen
(74) *Attorney, Agent, or Firm* — Akerman Senterfitt; Michael K. Dixon; Roy Zachariah

(57) ABSTRACT

Certain exemplary embodiments comprise a method, comprising: via an antecedents user interface, receiving a plurality of customer antecedents, each of the customer antecedents corresponding to one of a plurality of variables associated with one or more rules from a set of rules defining a plurality of service offerings; generating a prioritized list of the plurality of service offerings based upon application of the set of rules to the received customer antecedents; and causing the prioritized list to be rendered to a user.

18 Claims, 4 Drawing Sheets

SYSTEM, DEVICE, AND METHOD FOR RULE-BASED CONFIGURATION

BACKGROUND

In their sales process, telecommunication companies (such as telecommunication service providers) frequently desire to configure solutions (and/or any services comprised by those solutions) based on customer needs and/or requests and/or to price those solutions and/or service(s) optimally. The efficiency of the sales process can be impacted by any of the following factors:

- how well the customer needs can be mapped to the service provider's offering portfolio of solutions and/or service(s);
- how much optimization can be provided to simplify the solution and/or service(s);
- how much optimization can be provided in terms of the price of the solution and/or service(s) to the customer (which can be important to winning deals);
- how much confidence can be put on the solution and/or service(s) that a predictable profit margin is assured to the service provider (which can be important for the financial viability of the service provider); and/or
- how quickly the process can be adapted new and emerging offers and price structures (which can be important to remain competitive).

BRIEF DESCRIPTION OF THE DRAWINGS

A wide variety of potential embodiments will be more readily understood through the following detailed description of certain exemplary embodiments, with reference to the accompanying exemplary drawings in which.

DETAILED DESCRIPTION

Figure 1:
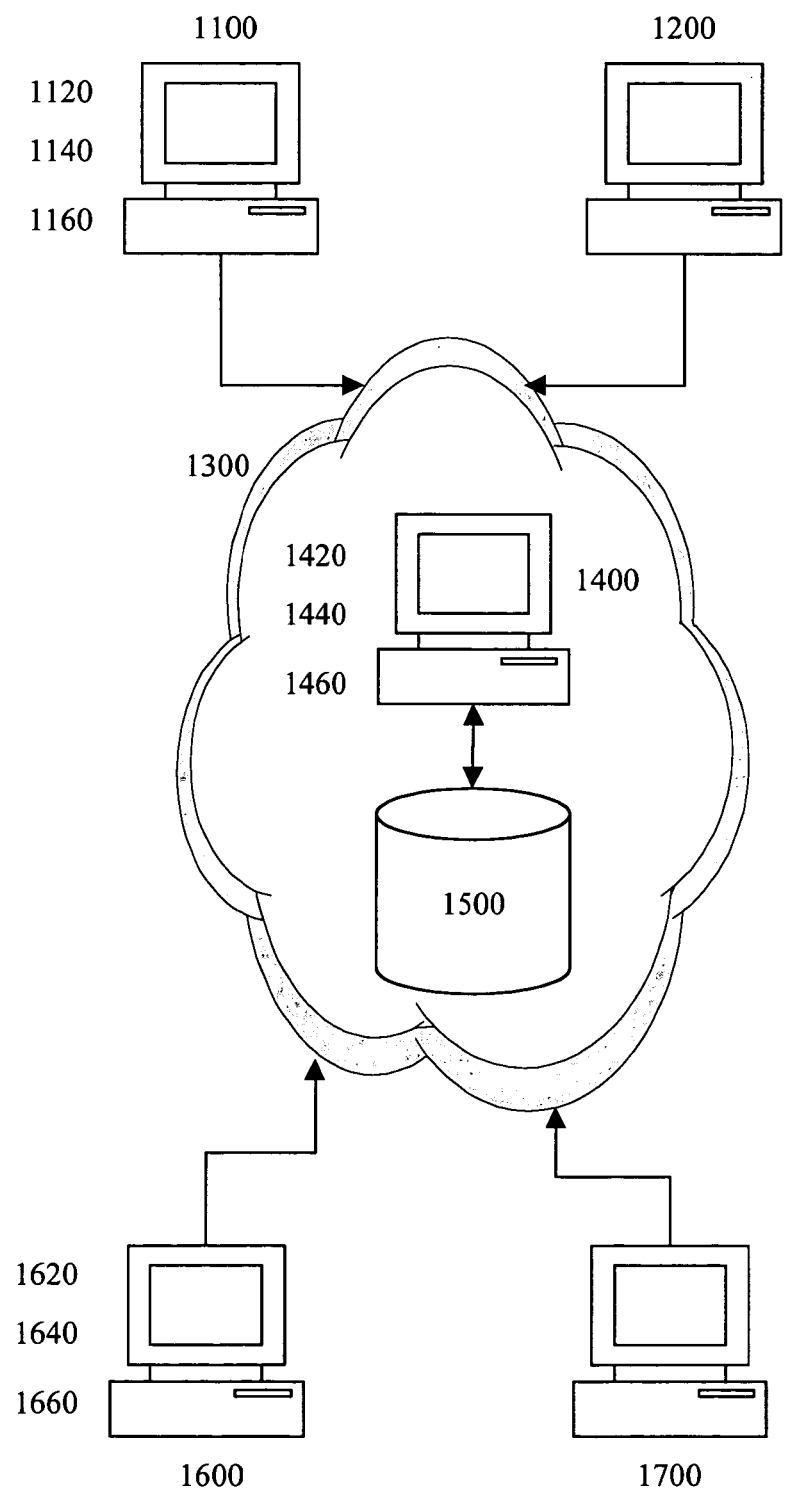
FIG. 1 is a block diagram of an exemplary embodiment of a system 1000.

In their sales process, telecommunication companies (such as telecommunication service providers) frequently desire to configure solutions (and/or any services comprised by those solutions) based on customer needs and/or requests and/or to price those solutions and/or service(s) optimally. The efficiency of the sales process can be impacted by any of the following factors:

- How well the customer needs can be mapped to the service provider's offering portfolio of solutions and/or service(s);
- How much optimization can be provided to simplify the solution and/or service(s);
- How much optimization can be provided in terms of the price of the solution and/or service(s) to the customer (which can be important to winning deals);
- How much confidence can be put on the solution and/or service(s) that a predictable profit margin is assured to the service provider (which can be important for the financial viability of the service provider); and/or
- How quickly the process can be adapted new and emerging offers and price structures (which can be important to remain competitive).

Certain exemplary embodiments can provide an automated rule-based sales platform that can satisfy one or more of the above factors of the sales process. The platform can be flexible, adaptable, extendable, and/or easy to maintain (in the sense that it can be able to evolve with the service provider's sales process, offerings, and/or price structures, and/or provide the least time to market and/or least implementation cost).

Certain exemplary embodiments can provide a method and/or corresponding system to capture and/or represent each solution and/or service offering as a model that comprises a set of rules, each having one or more attributes. The model, rules, and/or attributes can be saved in a database. Examples of the attributes can include:

- components (e.g., elements and/or sub-rules) comprised by the rule;
- events and/or conditions that can trigger the rule;
- dependencies between rules (e.g., rule X can imply rule Y);
- prices of components associated with the rule; and/or
- dependencies between components. There can be several levels (or hierarchy) of rules.

When a particular customer desire and/or need is specified, the system can capture the attributes of the need as "events" and/or "conditions". These events and/or conditions can cause one or more rules to be activated, which can get filtered through the remaining conditions, and results can be generated.

Rules can be activated, triggered, and/or fired when various events and conditions occur. A "to do" list of rules can be created for each user, which can be triggered by each event. After the rules are created, they can be stacked in appropriate sequence. A rule engine can constantly monitor for awaiting rule stacks and/or activate the rules based on the events and/or conditions.

An exemplary embodiment can provide a hosting operations and sales tracking system, which can utilize rules to define, configure, and/or price highly customized and/or complex hosting solutions and/or service(s) by the community of people (often referred to as product management) who are responsible for the offered solutions and/or service(s). For example, a number of hosting solutions and/or service offerings can be designed based on variables such as operating system (e.g., Unix, Windows, etc.), database management system (e.g., Oracle, MS-SQL Server, IBM DB2, CA Ingress r3 DBMS, etc.), web language (e.g., Java, MS-ASP, etc.) and/or network connectivity bandwidth (e.g., 200 MB/sec, 100 MB/sec, 45 MB/sec, 2 MB/sec, etc.). These offerings, potentially including pricing information associated therewith, can be input via a natural language rules interface. The input information can generate rules, such as "IF operating system is Windows, THEN available database management systems are MS-SQL Server and Ingress r3".

A customer seeking a solution and/or service(s) can be queried for relevant information, which can be entered via a natural language conditions interface. Upon receiving sufficient conditions, thereby signaling an event, a rules engine can be activated that applies relevant rules to the input conditions of the event. Some and/or all rules, events, and/or conditions can be weighted, such that an overall weight can be assigned to each generated solution, thereby enabling a best weighted solution to be selected as an optimal solution. Best solutions with relatively low weights can signal a mismatch between customer needs and offerings and/or can suggest corrective actions to product management.

A total price can be generated for the optimal offering, next best offerings, some offerings, and/or all offerings using previously entered service provider information such as unit prices, customer discounts, quantity discounts, package prices, package discounts, contract term discounts, contract term premiums, expediting premiums, customization premiums, etc., and/or entered customer information such as quantity, timing, contract terms, customization preferences, etc. Pricing can also be influenced by competitive landscape. In any case, all of the above factors can also be modeled as pricing rules.

Exemplary embodiments can provide a telecommunication offering configuration and pricing system for data solutions and/or services such as hosting and/or connectivity (e.g., circuit-based and/or packet based connectivity) and/or voice solutions and/or services. Such solutions and/or services can utilize IP, Frame Relay, ATM, and/or private line, etc.

Any portion of the system, including any natural language interface and/or the rules engine can run on a centralized computer, a cluster of computers, distributedly, in client-server mode, in stand-alone mode, and/or on a customer computer.

Additional function blocks and/or modules can be provided, such as:

Offering creation module: can define rules and/or their attributes which can describe a given telecom service. Marketing and/or "product" management typically uses this.

Client-DB communication module: can facilitate two-way communication between the client and the database. Such communication can be moderated by an application server, thus, the client does not necessarily need any database specific drivers to talk to the database.

User authentication module: potentially accomplished via user information contained in the application server and/or the database.

Data validation module: can facilitate data validation such as: verifying input provided on a HTML data capture form, ensuring compatibility of options/features selected for offerings and/or solutions, ensuring availability of price schedules, etc.

Offering browse/configuration module: can allow the user to configure a given offering according to offering configuration rules.

Price browse/calculations module: similar to offering configuration, this module can allow price applicability and discounts.

Messaging/alerts handling module: can facilitate management of any online or email alerts sent to the end-user or other systems.

Proposal and Contract creation module: once requested general, customer, service, and/or price information has been captured, can facilitate the user's generation of a proposal and/or contract using a word processing template.

Status request fulfillment module: can facilitate the user's request of a status update on previously submitted order requests.

Order submission module: can provide an interface to an Order Management System.

Credit check interface module: can automatically communicate with credit checking services.

User type management module: can facilitate access privilege control.

Admin functions module: can facilitate administrative functions such as user management and other system level controls.

Electronic contract approval module: can facilitate faster and/or more secure response and/or avoid paperwork.

Customer self-service module: can facilitate customers to tailor own solutions and/or services, price them, and/or order them to be provisioned.

Certain exemplary embodiments comprise a method, comprising: for each of a plurality of offerings, via a rules interface, receiving a plurality of variables and corresponding values, the received variables and values defining the offering; and representing the plurality of offerings as a set of rules, each rule comprising one or more offering antecedents and one or more offering consequents, each of the plurality of offerings corresponding to an offering antecedent of at least one of the rules.

Certain exemplary embodiments comprise a method, comprising: via an antecedents user interface, receiving a plurality of customer antecedents, each of the customer antecedents corresponding to one of a plurality of variables associated with one or more rules from a set of rules defining a plurality of offerings; generating a prioritized list of the plurality of offerings based upon application of the set of rules to the received customer antecedents; and causing the prioritized list to be rendered to a user.

FIG. 1 is a block diagram of an exemplary embodiment of a system 1000, which can comprise any number of offering management information devices 1100, 1200, each of which can be coupled to network 1300. Any rules management information device 1100 can comprise and/or render a natural language rules user interface 1120, which can be coupled to and/or utilize a rules processor 1140, either of which can be coupled to and/or utilize a browser 1160. Natural language rules user interface 1120 can receive information related to offerings, such as variables, values, weights, and/or prices of offerings and/or components of one or more offerings. Rules processor 1140 can utilize received offering information to generate one or more rule sets, each of which can describe and/or define an offering.

System 1000 can comprise any number of customer information devices 1600, 1700, each of which can be coupled to network 1300. Any customer information device 1600 can comprise and/or render a natural language antecedents user interface 1620, which can be coupled to and/or utilize a antecedents processor 1640, either of which can be coupled to and/or utilize a browser 1660.

Natural language antecedents user interface 1620 can receive information related to customer needs, requirements, and/or desires, such as values, quantities, and/or prices, any of which can be used as antecedents to one or more offering rules and/or rule sets. Antecedents processor 1640 can apply one or more rule sets to received information and/or antecedents to generate a list of offerings that fulfill and/or approximately fulfill one or more of the antecedents. The list can be prioritized by level of fulfillment, availability, price, and/or any other variable and/or criteria. A customer can select an offering from the list, and receive and/or negotiate to receive, a proposal, contract, and/or order, generated for that offering. Similarly, via customer information device 1600 and/or any other information device, an order entered for one or more offerings can be tracked.

Network 1300 can comprise a network information device 1400, which can function as a server and/or processor, such as an offering server, rules server, offering processor, and/or rules processor, etc. Network information device 1400 can comprise a network interface 1420, which can be coupled to and/or utilize a work flow and/or rules processor 1440, either of which can be coupled to and/or utilize data serving software 1460.

Coupled to network information device 1400, either within or outside network 1300, can be a database 1500, which can store: information related to offerings, such as variables, values, weights, and/or prices of offerings and/or components of one or more offerings; one or more rule sets; information related to customer needs, requirements, and/or desires, such as values, quantities, and/or prices, any of which can be used as antecedents to one or more offering rules and/or rule sets; and/or a list of offerings; an offering from a list of offerings; a proposal, contract, and/or order, generated for a selected offering; and/or information useful for tracking an order entered for one or more offerings; etc.

Figure 2:
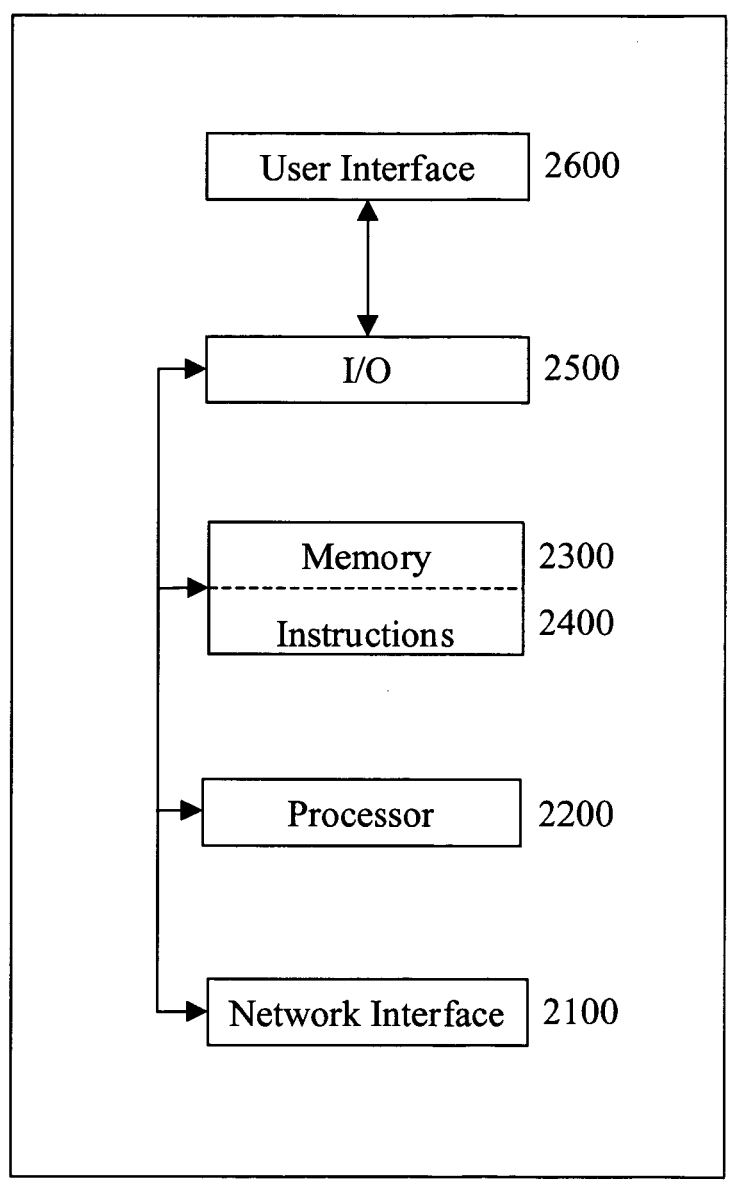
FIG. 2 is a block diagram of an exemplary embodiment of an information device 2000.

FIG. 2 is a block diagram of an exemplary embodiment of an information device 2000, which in certain operative embodiments can comprise, for example, [ ] of FIG. 1. Information device 2000 can comprise any of numerous well-known components, such as for example, one or more network interfaces 2100, one or more processors 2200, one or more memories 2300 containing instructions 2400, one or more input/output (I/O) devices 2500, and/or one or more user interfaces 2600 coupled to I/O device 2500, etc.

In certain exemplary embodiments, via one or more user interfaces 2600, such as a graphical user interface, a user can enter, manage, edit, and/or view information related to offerings, such as variables, values, weights, and/or prices of offerings and/or components of one or more offerings; one or more rule sets; information related to customer needs, requirements, and/or desires, such as values, quantities, and/or prices, any of which can be used as antecedents to one or more offering rules and/or rule sets; and/or a list of offerings; an offering from a list of offerings; a proposal, contract, and/or order, generated for a selected offering; and/or information useful for tracking an order entered for one or more offerings; etc.

Figure 3:
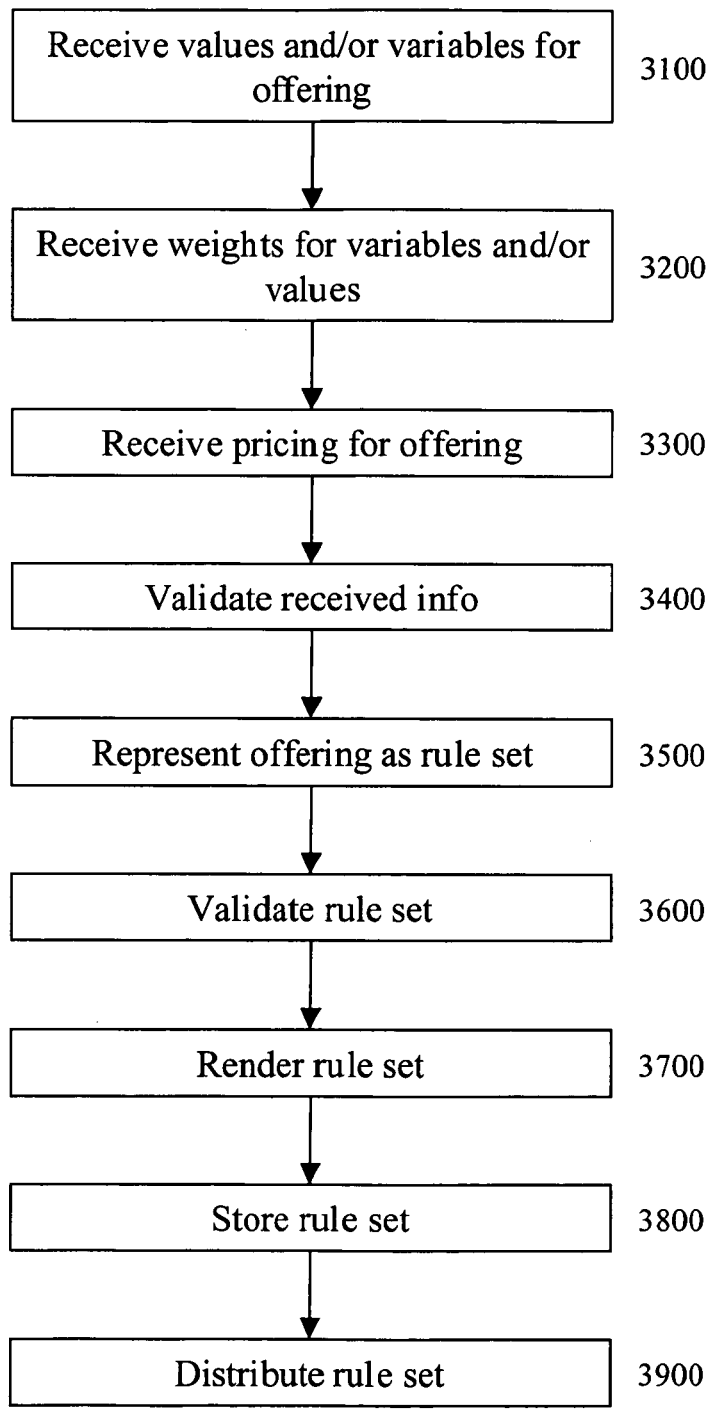
FIG. 3 is a flowchart of an exemplary embodiment of a method 3000.

FIG. 3 is a flowchart of an exemplary embodiment of a method 3000. At activity 3100, variables for one or more service offerings, and/or values corresponding to those variables, can be received, such as via a rules management information device and/or a network information device, etc. The variables and/or values can be used to generate a rule set useful for determining and/or selecting a service offering.

At activity 3200, weights for variables for the one or more service offerings, and/or weights for values corresponding to those variables, can be received, such as via a rules management information device and/or a network information device, etc. The weights can be useful for emphasizing and/or de-emphasizing certain variables and/or values when determining and/or selecting a service offering.

At activity 3300, pricing information for the one or more service offerings can be received, such as via a rules management information device and/or a network information device, etc. The pricing information can be useful for determining, and/or selecting a service offering. The pricing information can be useful for understanding the economic impact of a particular service offering, perhaps compared to alternative service offerings.

At activity 3400, entered and/or received information can be validated, such as via a rules management information device and/or a network information device, etc. The validation can prevent illogical, unwanted, and/or unavailable variables, values, weights, and/or pricing information from being entered, accepted, and/or utilized.

At activity 3500, using the received variables, values, weights, and/or pricing information, a rule set can be generated for each and/or all of the service offerings. The rule set can be generated by, for example, a rules management information device and/or a network information device, etc.

At activity 3600, the rule set can be validated, such as via a rules management information device and/or a network information device, etc. The validation can prevent illogical, unwanted, and/or unavailable results from being generated by the rule set. The validation can verify that application of the rule set will create a meaningful result.

At activity 3700, the rule set and/or any variables, values, weights, and/or pricing information used to generate the rule set, can be rendered, such a via a rules management information device and/or a network information device, etc. Such rendering can allow a human to validate the variables, values, weights, pricing information, individual rules, and/or rule set, which can help prevent illogical, unwanted, and/or unavailable results.

At activity 3800, the rule set and/or any variables, values, weights, and/or pricing information used to generate the rule set, can be stored, such a via a rules management information device, a network information device, and/or an associated database, etc.

At activity 3900, the rule set and/or any variables, values, weights, and/or pricing information used to generate the rule set, can be distributed for use by numerous information devices, such as a rules management information device, a network information device, and/or a customer information device, etc.

Figure 4:
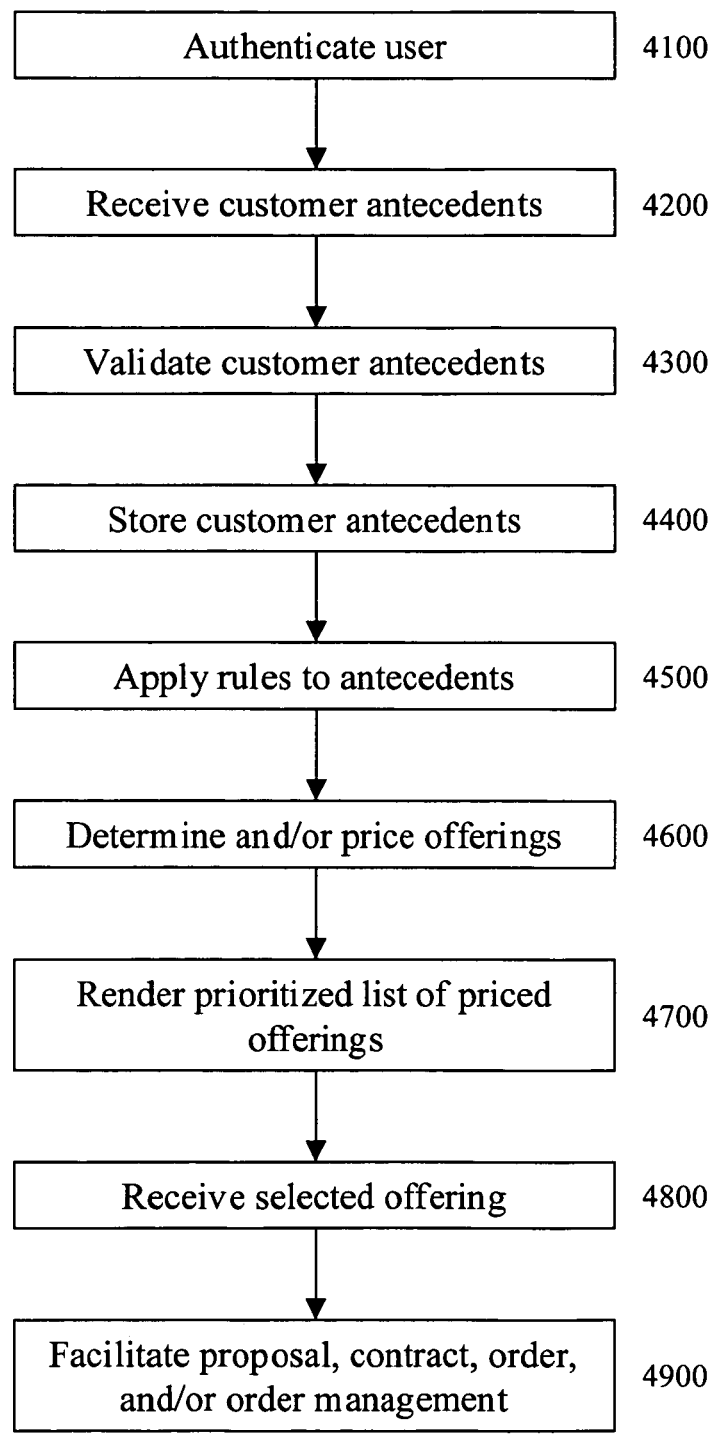
FIG. 4 is a flowchart of an exemplary embodiment of a method 4000.

FIG. 4 is a flowchart of an exemplary embodiment of a method 4000. At activity 4100, a user, such as a customer, can be authenticated, such as via a username and password, certificate, key, etc. The authentication can occur via any information device, such as via a customer information device and/or a network information device, etc.

At activity 4200, customer antecedents can be received such as via any information device, such as via a customer information device and/or a network information device, etc. The antecedents can be provided in any form, including in writing, verbally, via gesture, via button-pushing, and/or via user interface entry, etc. The antecedents can be provided in response to information gathering mechanisms, such as buttons, check boxes, pull-down menus, selection lists, sliders, dials, written questions, audible questions, etc.

At activity 4300, the entered, provided, and/or received antecedents can be validated, such as via any information device, such as via a customer information device and/or a network information device, etc. The validation can prevent illogical, unwanted, and/or unavailable antecedents from being entered, provided, received, accepted, and/or utilized.

At activity 4400, the entered, provided, received, and/or validated customer antecedents can be stored, such as via any information device, such as via a customer information device and/or a network information device, etc.

At activity 4500, one or more rule sets can be applied to the entered, provided, received, validated, and/or stored customer antecedents. The application of the rule set(s) can be performed via any information device, such as via a customer information device and/or a network information device, etc.

At activity 4600, the application of the rule set(s) can cause one or more results to be determined, such as via any information device, such as via a customer information device and/or a network information device, etc. The results can comprise one or more service offerings. The results can comprise a prioritized list of service offerings. The results can comprise one or more priced service offerings. The results can comprise one or more prices.

At activity 4700, the results can be rendered, such as via any information device, such as via a customer information device and/or a network information device, etc. For example, a prioritized list of priced serving offerings can be rendered to a customer and/or a sales agent. Such rendering can allow a human to perceive, learn, and/or analyze the results. Such a rendering can allow a human to select a particular service offering.

At activity 4800, a selected service offering is received, such as via any information device, such as via a customer information device and/or a network information device, etc.

At activity 4900, a proposal, contract, order, and/or management of an order can be facilitated, such as via any information device, such as via a customer information device and/or a network information device, etc. For example, the receipt of a selected service offering can be interpreted to mean that a proposal, contract, and/or order is desired for that particular service offering.

When the following terms are used herein, the accompanying definitions apply:

access—to approach, enter, exit, communicate with, or make use of.
adapted to—made suitable or fit for a specific use or situation.
antecedent—a condition and/or input.
apparatus—an appliance or device for a particular purpose
associate—to relate, map, and/or join together.
authenticate—To establish the authenticity of; to prove genuine, real, and/or true.
automatically—acting or operating in a manner essentially independent of external influence or control. For example, an automatic light switch can turn on upon "seeing" a person in its view, without the person manually operating the light switch.
can—is capable of, in at least some embodiments.
change—to cause to be different.
comprising—including but not limited to.
connectivity—the ability to make and maintain a connection between two or more points in a telecommunications system.
consequent—a result and/or output.
contract—to An agreement between two or more parties, especially one that is written and enforceable by law.
coupleable—capable of being joined, connected, and/or linked together.
data—distinct pieces of information, usually formatted in a special or predetermined way and/or organized to express concepts.
define—to precisely and/or distinctly describe and/or specify.
desired—indicated, expressed, and/or requested.
determine—ascertain, obtain, and/or calculate.
fulfill—to carry out, effect, and/or complete.
generate—to create or produce.
hosting—to store, provide, serve, and/or maintain, via a computer called a server, files, messages, data and/or programs that another computer can access by means of a network.
input/output (I/O) device—the input/output (I/O) device of the information device can be any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.
instructions—directions adapted to perform a particular operation or function.
may—is allowed to, in at least some embodiments.
memory—a device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory can be coupled to a processor and can store instructions adapted to be executed by processor according to an embodiment disclosed herein.
natural language—everyday human language, as opposed to a computer language or other artificial language.
network—a communicatively coupled plurality of nodes.
network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.
offering—an available solution, service, and/or product.
operative—being in effect; operating.
order—to a written direction to furnish service and/or supplies or the like.
plurality—the state of being plural and/or more than one.
predetermined—established in advance.
price—The amount as of money or goods, asked for or given in exchange for something else.
pricing information—information related to price.
prioritized list—a series of names, words, or other items written, printed, presented, and/or imagined one after the other in order of importance.
processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can be a central processing unit, a local controller, a remote controller, parallel controllers, and/or distributed controllers, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.
proposal—That which is proposed, or propounded for consideration or acceptance; a scheme or design; terms or conditions proposed; an offer.
provide—to make available; to supply; to prepare.
receive—to take, obtain, and/or acquire.
render—to display, annunciate, speak, print, and/or otherwise make perceptible to a human.
represent—to describe and/or symbolize.

rule—a conditional expression, typically in "If X, then Y" format, that defines one or more consequents (e.g., Y) based on one or more antecedents (e.g., X).

service—useful work that does not produce a tangible commodity.

set—a related plurality.

substantially—to a great extent or degree.

system—a collection of mechanisms, devices, data, and/or instructions, the collection designed to perform one or more specific functions.

telecommunications—the science and technology of communication at a distance by electronic transmission of impulses.

telecommunications service—a specified set of information storage and/or transfer capabilities provided to a customer by a telecommunications system.

telecommunications service offering—one or more predetermined telecommunications services available for purchase, lease, and/or license by a customer.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

validate—To establish the validity and/or soundness of, to corroborate.

value—a defined, assigned, and/or calculated quantity or quality.

variable—a parameter.

voice services—any of a plurality of telecommunications services related to the transmission of voice messages, including, for example, voice calls, calls to the operator, directory assistance, call waiting, call forwarding, 3-way calling, conference calling, toll-free calling, Voice over IP, Voice over ATM, Voice over Frame Relay, voice-mail, translation of voice-mail into e-mail, translation of text messages into voice-mail, translation of spoken words into text, voice response system, emergency calls (e.g., 911), enhanced emergency calls (e.g., E911 capabilities), and access for people with disabilities.

weight—A factor assigned to a number in a computation, such as in determining an average, to make the number's effect on the computation reflect its importance.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method for use with telecommunication service offerings, comprising:

receiving a plurality of customer antecedents entered by a customer via a natural language antecedents customer interface implemented via a customer information device, wherein the plurality of customer antecedents are generated based in part on a detected gesture of the customer;

generating a set of rules defining a plurality of telecommunications service offerings based on the plurality of customer antecedents and weights associated with each of a plurality of variables corresponding to each of the plurality of customer antecedents, wherein each of the plurality of variables is associated with at least one rule from the set of rules, and wherein the plurality of telecommunications service offerings comprise predetermined telecommunications services available for selection by the customer;

rendering the set of rules to the customer;

determining the plurality of telecommunications service offerings for the customer, wherein a first variable of the plurality of variables is emphasized over a second variable of the plurality of variables when determining the plurality of telecommunications services offerings if a weight of the first variable is greater than a weight of the second variable;

generating, by utilizing instructions from memory that are executed by a processor, a prioritized list of the plurality of telecommunications service offerings for the customer based upon application of the set of rules to the customer antecedents;

causing the prioritized list to be rendered to the customer;

receiving a selection of a telecommunications service offering of the plurality of telecommunications service offerings from the customer based on the prioritized list; and generating, by utilizing the processor, a contract for the customer based on the selection of the telecommunications service offering of the plurality of telecommunications service offerings received from the customer.

2. The method of claim 1, further comprising authenticating the customer.

3. The method of claim 1, further comprising validating at least one of the plurality of received customer antecedents.

4. The method of claim 1, further comprising applying the set of rules to the received customer antecedents.

5. The method of claim 1, further comprising determining an overall weight for each of the plurality of telecommunications service offerings based upon an application of the set of rules to the received customer antecedents.

6. The method of claim 1, further comprising pricing each telecommunications service offering on the prioritized list of the plurality of telecommunications service offerings.

7. The method of claim 1, further comprising validating the prioritized list.

8. The method of claim 1, further comprising facilitating generation of a proposal for at least one of the telecommunications service offerings from the prioritized list of the plurality of telecommunications service offerings.

9. The method of claim 1, further comprising facilitating generation of an order for at least one of the telecommunications service offerings from the prioritized list of the plurality of telecommunications service offerings.

10. The method of claim 1, further comprising providing status information for an order for at least one of the telecommunications service offerings from the prioritized list of the plurality of telecommunications service offerings.

11. The method of claim 1, wherein the set of rules is weighted.

12. The method of claim 1, wherein the set of rules comprises pricing rules.

13. The method of claim 1, wherein the plurality of telecommunications service offerings comprises hosting.

14. The method of claim 1, wherein the plurality of telecommunications service offerings comprises web site hosting.

15. The method of claim 1, wherein the plurality of telecommunications service offerings comprises connectivity.

16. The method of claim 1, wherein the plurality of telecommunications service offerings comprises voice services.

17. A system for use with telecommunication service offerings, comprising:

a natural language antecedents customer interface configured to receive a plurality of customer antecedents entered by a customer via a customer information device; and an antecedents processor that executes instructions from memory to perform operations comprising:

generating a set of rules defining a plurality of telecommunications service offerings based on the plurality of customer antecedents and weights associated with each of a plurality of variables corresponding to each of the plurality of customer antecedents, wherein each of the plurality of variables is associated with at least one rule from the set of rules, wherein the plurality of telecommunications service offerings comprise predetermined telecommunications services available for selection by the customer;

rendering the set of rules to the customer;

determining the plurality of telecommunications service offerings for the customer, wherein a first variable of the plurality of variables is emphasized over a second variable of the plurality of variables when determining the plurality of telecommunications services offerings if a weight of the first variable is greater than a weight of the second variable;

generating a prioritized list of the plurality of telecommunications service offerings for the customer based upon application of the set of rules to the customer antecedents;

causing the prioritized list to be rendered to a customer;

receiving a selection of a telecommunications service offering of the plurality of telecommunications service offerings from the customer based on the prioritized list; and generating a contract for the customer based on the selection of the telecommunications service offering of the plurality of telecommunications service offerings received from the customer.

18. A machine readable device comprising instructions, which, when loaded and executed by a processor, cause the processor to perform operations comprising:

receiving a plurality of customer antecedents entered by a customer via a natural language antecedents customer interface implemented via a customer information device generating a set of rules defining a plurality of telecommunications service offerings based on the plurality of customer antecedents and weights associated with each of a plurality of variables corresponding to each of the plurality of customer antecedents, wherein each of the plurality of variables is associated with at least one rule from the set of rules, wherein the plurality of telecommunications service offerings comprise predetermined telecommunications services available for selection by the customer;

rendering the set of rules to the customer;

determining the plurality of telecommunications service offerings for the customer, wherein a first variable of the plurality of variables is emphasized over a second variable of the plurality of variables when determining the plurality of telecommunications services offerings if a weight of the first variable is greater than a weight of the second variable;

generating a prioritized list of the plurality of telecommunications service offerings for the customer based upon application of the set of rules to the customer antecedents;

causing the prioritized list to be rendered to a customer;

receiving a selection of a telecommunications service offering of the plurality of telecommunications service offerings from the customer based on the prioritized list; and generating a contract for the customer based on the selection of the telecommunications service offering of the plurality of telecommunications service offerings received from the customer.

* * * * *